United States Patent Office 2,775,582
Patented Dec. 25, 1956

2,775,582

UNSYMMETRICAL TRISAZO DYESTUFF

Norman L. Anderson, Hamburg, N. Y., assignor to Allied Chemical & Dye Corporation, New York, N. Y., a corporation of New York No Drawing. Application April 29, 1952,
Serial No. 285,070

13 Claims. (Cl. 260—173)

This invention relates to unsymmetrical trisazo dyestuffs which produce blue dyeings on cellulosic fibers the fastness properties of which dyeings are increased by treating with coppering agents. It relates more particularly to unsymmetrical trisazo direct dyestuffs for cellulosic fibers in which I-acid imide (5,5-dihydroxy-2,2'-dinaphthylamine-7,7'-disulfonic acid) is linked by azo groups in ortho-position to the hydroxyl groups (i. e., in the 6- and 6'-positions), on the one hand, to an aryl radical and, on the other hand, to a poly-substituted benzene radical having an alkoxy radical in ortho-position to said azo group as one substituent and an ortho-hydroxy-carboxy-arylazo radical as another substituent, with or without an alkyl or alkoxy radical as an additional substituent.

I have discovered that certain unsymmetrical trisazo dyestuffs of said type—namely, those dyestuffs wherein the aryl radical is an oxy-naphthyl sulfonic radical which is linked in the 1-position to the azo group and which contains an oxy radical (a hydroxyl group or an alkoxy or substituted alkoxy radical) in the 2-position and a sulfo group in one of the beta-positions remote from the oxy radical (the 6- or 7-position)—constitute a class of valuable dyestuffs having desirable shade and dyeing properties and producing dyeings on cellulosic fibers which, when treated on the fiber with coppering agents, are converted to coppered derivatives having desirable fastness properties, especially to washing and to light.

Thus, I have discovered that the unsymmetrical trisazo compounds which in the free acid form correspond with the following Formula I are valuable direct dyestuffs for cellulosic fibers; they possess excellent affinity for natural and artificial cellulosic fibers, such as cotton, viscose and copper rayon, which they dye in clear, bright blue shades:

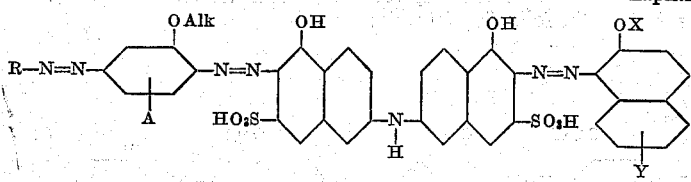

wherein:

R represents an ortho-hydroxy-carboxyaryl radical derived from benzene or naphthalene and the lower alkyl, lower alkoxy and chlorinated derivatives thereof, and especially a salicylic acid radical (an ortho-hydroxy-carboxyphenyl radical) in which the hydroxyl group is in para-position to the azo group;

Alk represents a lower alkyl radical and especially methyl or ethyl;

A represents hydrogen, Alk or OAlk, especially methoxy or ethoxy, and preferably in ortho-position to the R—N=N— radical;

X represents hydrogen or an alkyl or substituted alkyl radical, and especially a lower alkyl radical (such as methyl, ethyl, propyl or butyl, and preferably methyl or ethyl) or a lower hydroxyalkyl radical (such as hydroxymethyl, hydroxyethyl, hydroxypropyl, or hydroxybutyl) or a lower carboxyalkyl radical (such as carboxymethyl, carboxyethyl, carboxypropyl, carboxybutyl, and preferably carboxymethyl); and Y represents a sulfo group in the 6- or 7-position relative to the azo group, that is, in one of the beta-positions remote from the —OX radical, and preferably in the 6-position. (In this and other formulae herein the lower alkyl radicals represented by Alk may be the same or different.)

When the dyed fiber is aftertreated in the known manner, in the same dyebath or another treatment bath, with a water-soluble copper salt or other coppering agent, the fastness properties of the dyeings are considerably improved, especially against the fading action of light and washing, without substantial change in the shade of the dyeings.

Those dyestuffs in which the oxy-naphthyl sulfonic radical is a naphthol radical, a methoxynaphthyl radical, an ethoxynaphthyl radical or a naphthoxyacetic radical (in which X in the above formula represents hydrogen, methyl, ethyl or carboxymethyl) are of particular importance, and those in which it is a naphthoxyacetic radical are preferred in view of their exceptional fastness to light and to washing.

The dyestuffs of the present invention can be obtained in various ways. A simple and advantageous method comprises coupling one molecular proportion of I-acid imide (5,5' - dihydroxy - 2,2' - dinaphthylamine - 7,7'-disulfonic acid) with substantially one molecular proportion of each of the following diazotized aromatic amines: (1) a polysubstituted mononuclear aromatic amine having ortho-hydroxy-carboxy-arylazo and lower alkoxy substituents in the nucleus, and corresponding with the general formula:

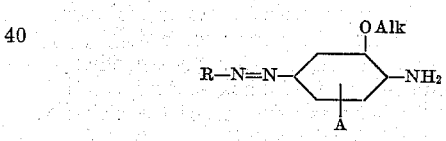

wherein R, Alk and A have the meaning set out above in connection with Formula I, and (2) a 1-amino-2-oxy-naphthalene sulfonic acid having the sulfo group in one of the beta-positions remote from the oxy radical and corresponding with the general formula:

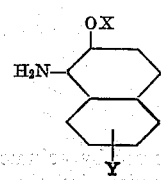

(I)

wherein X and Y have the meaning set out above in connection with Formula I.

The coupling may take place with said diazotized amines in either order. As is usual with dyestuffs of this class, the coupling is carried out in media made alkaline with sodium carbonate or bicarbonate, ammonia or equivalent alkali.

The polysubstituted mononuclear aromatic amine is preferably a p-salicylazo derivative of a lower alkoxy-substituted toluidine or phenetidine in which the p-salicylazo radical is para to the amino group and the lower alkoxy radical (having 1 to 4 carbon atoms, preferably methoxy or ethoxy) is ortho to the amino group. Polysubstituted mononuclear aromatic amines of this type can be obtained, as is well known, by diazotizing an ortho-hydroxy-carboxy-arylamine and coupling with a suitable alkoxy-substituted mononuclear aromatic amine. Thus, a p-amino-salicylic acid (e. g., 1-amino-4-hydroxy-3-benzoic acid or 1-amino-4-hydroxy-5-methyl-3-benzoic acid) or an o-amino-salicylic acid (e. g., 1-amino-2-hydroxy-3-benzoic acid) can be diazotized and coupled with 1-amino-2-methoxy-5-methyl-benzene or 1-amino-2,5-dimethoxy-benzene or 1-amino-2-ethoxy-5-methyl-benzene or 1-amino-2,5-diethoxy-benzene or 1-amino-2-methoxy (or ethoxy)-benzene or 1-amino-2,5-dipropoxy-benzene or 1-amino-2-propoxy-5-methyl-benzene or 1-amino-2-ethoxy-5-ethyl-benzene. Alternatively, as is well known, polysubstituted mononuclear aromatic amines of the aforesaid type can be obtained by coupling a suitable diazotized 1-amino-3-alkoxy-4-nitrobenzene compound (e. g., 1-amino-3-methoxy-6-methyl-4-nitrobenzene) with a suitable ortho-hydroxy-carboxy-aryl compound of the benzene or naphthalene series (e. g., salicylic acid or 2,3-hydroxynaphthoic acid) and reducing the resulting nitro-monoazo compound to the corresponding amino compound.

The 1-amino-2-oxy-naphthalene sulfonic acid may be a 1-amino-2-naphthol-6 or 7-sulfonic acid or salt (e. g., an alkali metal or ammonium salt) or an alkyl, hydroxy-alkyl or carboxy-alkyl ether thereof. Preferably it is a lower alkyl, lower hydroxy-alkyl or lower carboxy-alkyl ether, and especially one which is a methyl, ethyl or carboxy-methyl ether.

Desired modifications of shade of dyeings without substantial modification of fastness properties of the dyestuffs can be obtained by employing in the preparation of the dyestuffs a mixture of two or more of the above components which are close homologs; for example, by employing a mixture of 1-amino-5-methyl-2-methoxy-benzene and 1-amino-5-methyl-2-ethoxy-benzene. The invention accordingly includes mixtures of the claimed dyestuffs as well as individual dyestuffs.

The invention will be illustrated by the following specific examples, but it is to be understood that it is not limited to the details thereof and that changes may be made without departing from the scope of the invention. The temperatures are in degrees centigrade and the parts are by weight unless designated as parts by volume. Where parts are by volume, the amount signifies the volume occupied by the same number of parts by weight of water at 4° C.

*Example 1*

An aqueous paste of p-diazosalicylic acid was prepared by adding 7.2 parts of sodium nitrite dissolved in 30 parts of water to a mixture of 15.3 parts of p-aminosalicylic acid (5-amino-2-hydroxy-benzoic acid), 350 parts of water, 22 parts of 20° Bé. hydrochloric acid and sufficient ice to maintain a temperature of 25 to 30°. The paste was added to 15.5 parts of ethyl cresidine (1-amino-2-ethoxy-5-methyl-benzene) which had been dispersed in 400 parts of warm (55°) water with the aid of 2 parts of a commercial dispersing agent ("Tween 20," a polyoxyalkylene derivative of sorbitan monolaurate) and cooled to 5° with ice. The mixture was further agitated for 2 hours. Ten parts of sodium acetate dissolved in 50 parts of water were then introduced during 2 hours, after which the mixture was agitated at room temperature for 96 hours to carry the coupling reaction to substantial completion. The mixture was rendered acid to Congo red with hydrochloric acid and filtered.

Approximately ½ of the aminomonoazo compound thus obtained (about ¹⁄₂₀ mol) was mixed with 300 parts of water and sufficient sodium carbonate (soda ash) to produce a slightly alkaline solution. 3.5 parts of sodium nitrite were added and, after sufficient agitation to dissolve the nitrite, the mixture was poured into an agitated mixture of about 35 parts of 20° Bé. hydrochloric acid and 200 parts of ice to effect diazotization, which was substantially complete after 3 hours. The diazomonoazo compound thus obtained was introduced during ½ hour into an iced alkaline solution of I-acid imide which was at 5° and had been prepared from 27.6 parts of I-acid imide, 350 parts of water and 19.5 parts of sodium carbonate. The reaction mixture was agitated for 16 hours at 0 to 5°, then heated to 80°, salted to 10% by volume with common salt, cooled and filtered. The filter cake was washed with 220 parts of 10% aqueous sodium chloride.

The disazo compound thus obtained was dissolved in a solution of 20 parts of sodium carbonate in 300 parts of water, and the solution was cooled to 0° with 200 parts of ice. An aqueous slurry of diazotized 1-amino-6-sulfo-2-naphthyl ether of hydroxyacetic acid was prepared by adding a slightly alkaline solution, containing 21 parts of 1-amino-6-sulfo-2-naphthoxyacetic acid, sodium carbonate, 3.5 parts of sodium nitrite and 200 parts of water, to a mixture of 25 parts of 20° Bé. hydrochloric acid and 100 parts of ice. The slurry was added to the agitated aqueous solution of disazo compound at 0° in an amount sufficient to give a positive test for diazo compound, and the coupling mixture was agitated for 16 hours at 0 to 5°. The mixture was heated to 90°, salted to 10% by volume, cooled to 30°, filtered, dried and ground.

The trisazo dyestuff thus obtained corresponds with the following formula:

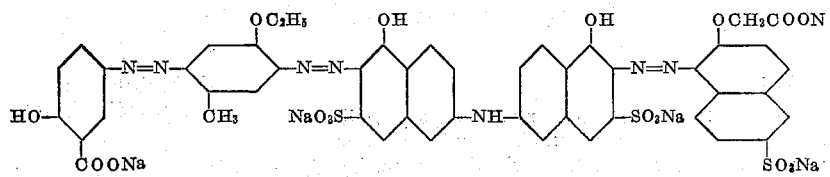

It is a blue-black powder, soluble in water to form blue solutions, and dyeing cotton bright blue shades which when after-treated in conventional manner with coppering agents (such as, copper sulfate) possess excellent fastness properties. Exhaustion of the dyebath is excellent.

Example 2

By employing 14.1 parts of cresidine in place of the ethyl cresidine in Example 1, a dyestuff was obtained corresponding with the following formula:

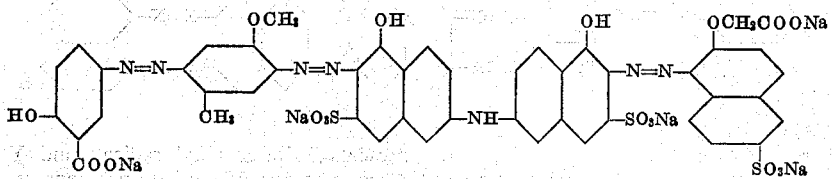

It is a blue-black powder, soluble in water to form blue solutions, and dyeing cotton bright blue shades which when aftertreated with coppering agents are somewhat redder and possess substantially equal fastness properties as compared with those of the coppered dyestuff of Example 1.

Example 3

By substituting 18.6 parts of 1-amino-2,5-diethoxy-benzene for the ethyl cresidine in Example 1, a dyestuff was obtained corresponding with the following formula:

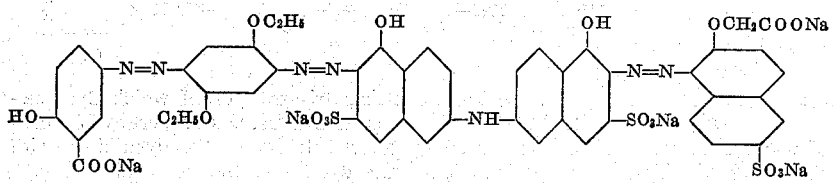

It is a blue-black powder, soluble in water to form blue solutions, and dyeing cotton blue shades which when aftertreated with coppering agents are a somewhat greener cast than the coppered dyeings obtained with the dyestuff of Example 1.

Example 4

By employing 18.9 parts of 1-amino-2-ethoxy-naphthalene-6-sulfonic acid in place of the 1-amino-6-sulfo-2-naphthoxyacetic acid in Example 2, a dyestuff was obtained corresponding with the following formula:

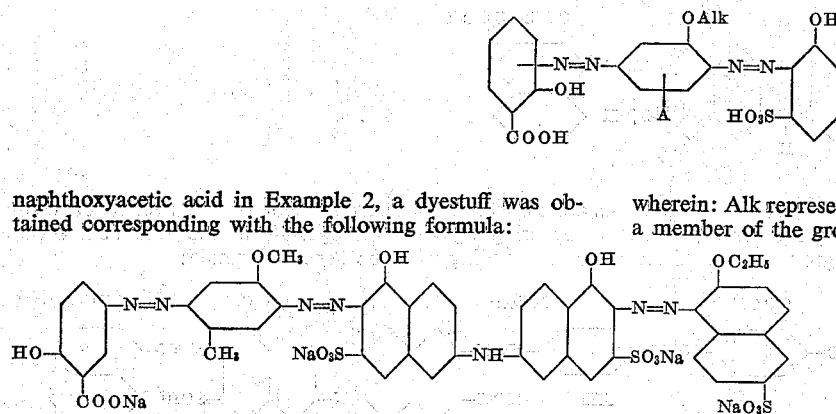

It is a blue-black powder, soluble in water to form blue solutions, and dyeing cotton blue shades which when aftertreated with coppering agents are a somewhat less reddish blue than the coppered dyeings obtained with the dyestuff of Example 2.

Dyestuffs possessing similar properties are obtained by employing 17.9 parts of 1-amino-2-methoxy-naphthalene-6-sulfonic acid or 16.9 parts of 1-amino-2-naphthol-6-sulfonic acid in place of the 1-amino-6-sulfo-2-naphthoxyacetic acid in Example 2.

I claim:

1. An unsymmetrical trisazo dyestuff which dyes cellulosic fibers blue shades the fastness properties of which are improved by aftertreatment of the dyed fiber with coppering agents, said dyestuff in the free acid form corresponding with the general formula:

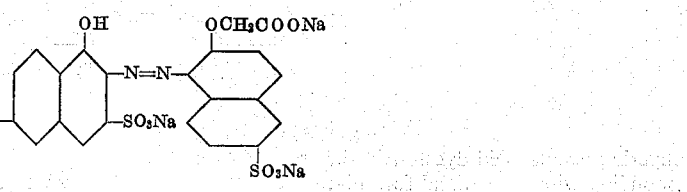

wherein: R represents an ortho-hydroxy-carboxyaryl radical derived from a member of the group consisting of benzene, naphthalene, and the lower alkyl, lower alkoxy, and chlorinated derivatives thereof, Alk represents a lower alkyl radical, A represent a member of the group consisting of hydrogen, Alk and OAlk, X represents a member of the group consisting of hydrogen, lower alkyl radicals, lower hydroxyalkyl radicals and lower carboxyalkyl radicals, and Y represents a sulfo group in one of the beta-positions remote from the —OX radical.

2. An unsymmetrical trisazo dyestuff which dyes cellulosic fibers blue shades the fastness properties of which are improved by aftertreatment of the dyed fiber with coppering agents, said dyestuff in the free acid form corresponding with the general formula:

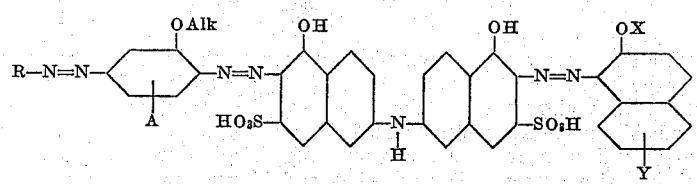
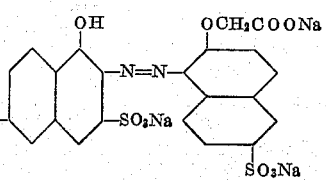

wherein: Alk represents a lower alkyl radical, A represents a member of the group consisting of hydrogen, Alk and OAlk, X represents a member of the group consisting of hydrogen, lower alkyl radicals, lower hydroxyalkyl radicals and lower carboxyalkyl radicals, and Y represents a sulfo group in one of the beta-positions remote from the —OX radical.

3. An unsymmetrical trisazo dyestuff which dyes cellu-

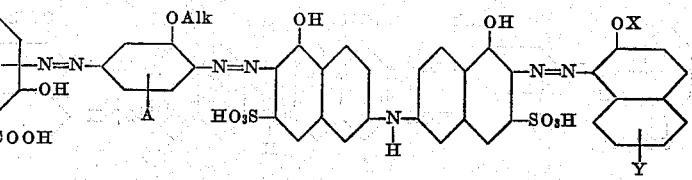
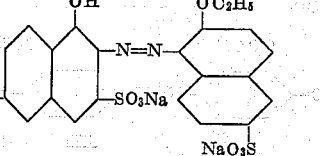

losic fibers blue shades the fastness properties of which are improved by aftertreatment of the dyed fiber with coppering agents, said dyestuff in the free acid form corresponding with the general formula:

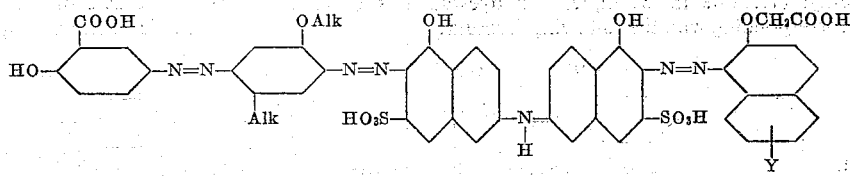

wherein: R represents an ortho-hydroxy-carboxyaryl radical derived from a member of the group consisting of benzene, naphthalene, and the lower alkyl, lower alkoxy, and chlorinated derivatives thereof, Alk represents a lower alkyl radical, A represents a member of the group consisting of hydrogen, Alk and OAlk, and Y represents a sulfo group in one of the beta-positions remote from the —OAlk—COOH group.

4. An unsymmetrical trisazo dyestuff which dyes cellulosic fibers blue shades the fastness properties of which are improved by aftertreatment of the dyed fiber with coppering agents, said dyestuff in the free acid form corresponding with the general formula:

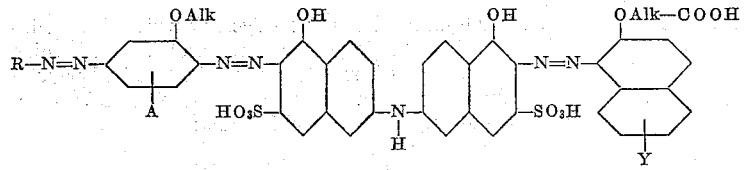

wherein: Alk represents a lower alkyl radical, A represents a member of the group consisting of hydrogen, Alk and OAlk, and Y represents a sulfo group in one of the beta-positions remote from the —OAlk—COOH group.

5. An unsymmetrical trisazo dyestuff which dyes cellulosic fibers blue shades the fastness properties of which are improved by aftertreatment of the dyed fiber with coppering agents, said dyestuff in the free acid form corresponding with the general formula:

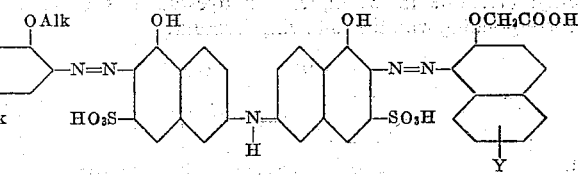

wherein: Alk represents a lower alkyl radical, and Y represents a sulfo group in one of the beta-positions remote from the —OCH₂COOH.

6. An unsymmetrical trisazo dyestuff which dyes cellulosic fibers blue shades the fastness properties of which are improved by aftertreatment of the dye fiber with coppering agents, said dyestuff in the free acid form corresponding with the general formula:

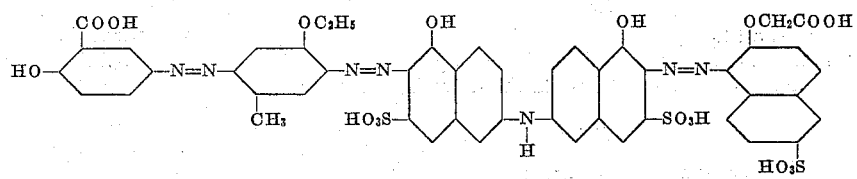

7. An unsymmetrical trisazo dyestuff which dyes cellulosic fibers blue shades the fastness properties of which are improved by aftertreatment of the dyed fiber with coppering agents, said dyestuff in the free acid form corresponding with the general formula:

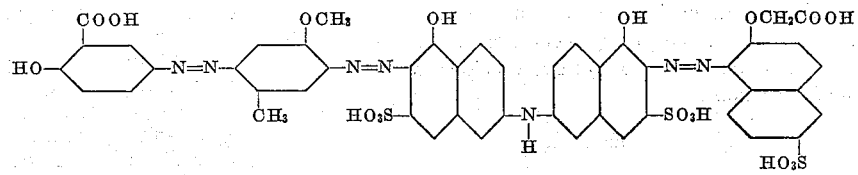

8. An unsymmetrical trisazo dyestuff which dyes cellulosic fibers blue shades the fastness properties of which are improved by aftertreatment of the dyed fiber with coppering agents, said dyestuff in the free acid form corresponding with the general formula:

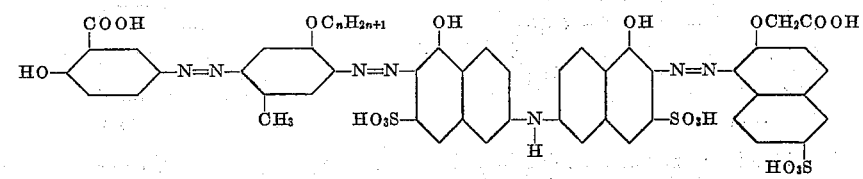

wherein $n$ is an integer having a maximum value of 2.

9. An unsymmetrical trisazo dyestuff which dyes cellulosic fibers blue shades the fastness properties of which are improved by aftertreatment of the dyed fiber with coppering agents, said dyestuff in the free acid form corresponding with the general formula:

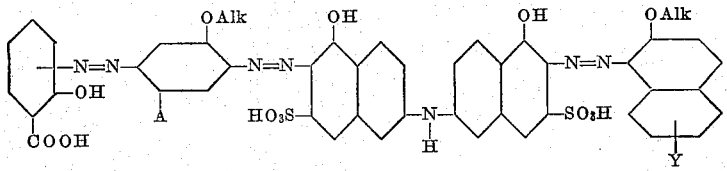

wherein: Alk represents a lower alkyl radical, A represents a member of the group consisting of hydrogen, Alk and OAlk, and Y represents a sulfo group in one of the beta-positions remote from the —OAlk group.

10. An unsymmetrical trisazo dyestuff which dyes cellulosic fibers blue shades the fastness properties of which are improved by aftertreatment of the dyed fiber with coppering agents, said dyestuff in the free acid form corresponding with the general formula:

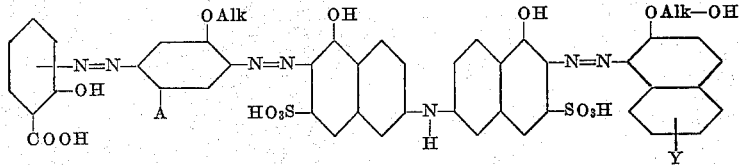

wherein: Alk represents a lower alkyl radical, A represents a member of the group consisting of hydrogen, Alk and OAlk, and Y represents a sulfo group in one of the beta-positions remote from the —OAlk—OH group.

11. An unsymmetrical trisazo dyestuff which dyes cellulosic fibers blue shades the fastness properties of which are improved by aftertreatment of the dyed fiber with coppering agents, said dyestuff in the free acid form corresponding with the general formula:

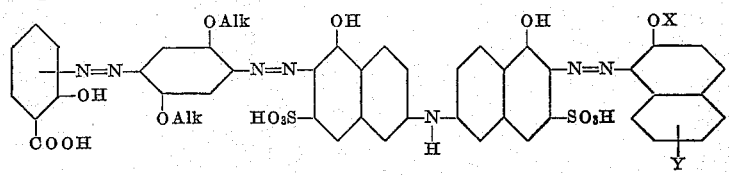

wherein: Alk represents a lower alkyl radical, X represents a member of the group consisting of hydrogen, lower alkyl radicals, lower hydroxy alkyl radicals and lower carboxyalkyl radicals, and Y represents a sulfo group in one of the beta-positions remote from the —OX radical.

12. An unsymmetrical trisazo dyestuff which dyes cellulosic fibers blue shades the fastness properties of which are improved by aftertreatment of the dyed fiber with coppering agents, said dyestuff in the free acid form corresponding with the general formula:

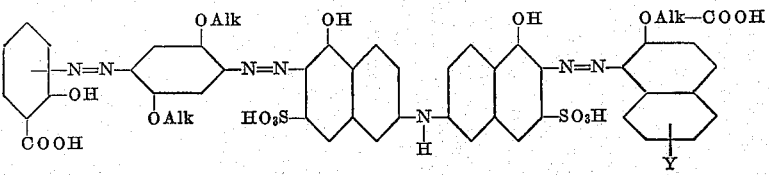

wherein: Alk represents a lower alkyl radical, and Y represents a sulfo group in one of the beta-positions remote from the OAlk—COOH group.

13. An unsymmetrical trisazo dyestuff which dyes cellulosic fibers blue shades the fastness properties of which are improved by aftertreatment of the dyed fiber with coppering agents, said dyestuff in the free acid form corresponding with the general formula:

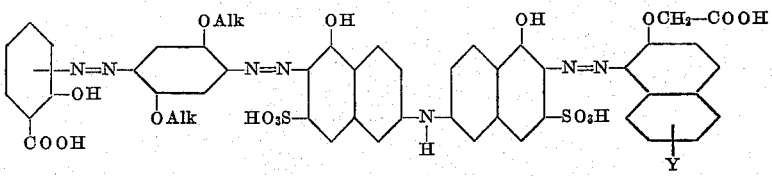

wherein: Alk represents a lower alkyl radical, and Y represents a sulfo group in one of the beta-positions remote from the $OCH_2$—COOH group.

References Cited in the file of this patent

UNITED STATES PATENTS

| | | |
|---|---|---|
| 2,270,675 | Stein et al. | Jan. 20, 1942 |
| 2,369,516 | Anderau | Feb. 13, 1945 |

FOREIGN PATENTS

| | | |
|---|---|---|
| 268,413 | Switzerland | Aug. 16, 1950 |